(12) United States Patent
Hanson

(10) Patent No.: US 11,224,214 B2
(45) Date of Patent: Jan. 18, 2022

(54) WATERFOWL DECOY

(71) Applicant: David M. Hanson, Spanish Fork, UT (US)

(72) Inventor: David M. Hanson, Spanish Fork, UT (US)

(*) Notice: Subject to any disclaimer, the term of this patent is extended or adjusted under 35 U.S.C. 154(b) by 139 days.

(21) Appl. No.: 16/228,430

(22) Filed: Dec. 20, 2018

(65) Prior Publication Data

US 2019/0116782 A1 Apr. 25, 2019

Related U.S. Application Data

(63) Continuation-in-part of application No. 15/628,511, filed on Jun. 20, 2017, now Pat. No. 10,194,654, which is a continuation of application No. 15/239,330, filed on Aug. 17, 2016, now Pat. No. 10,231,448.

(60) Provisional application No. 62/205,916, filed on Aug. 17, 2015.

(51) Int. Cl.
*A01M 31/06* (2006.01)

(52) U.S. Cl.
CPC .................... *A01M 31/06* (2013.01)

(58) Field of Classification Search
CPC ..................................... A01M 31/06
USPC ............................................ 43/3, 2
See application file for complete search history.

(56) References Cited

U.S. PATENT DOCUMENTS

| 243,954 | A | * | 7/1881 | North | A01M 31/06 43/3 |
|---|---|---|---|---|---|
| 1,243,954 | A | | 7/1881 | North | |
| 1,392,065 | A | | 9/1921 | Klock | |
| 1,468,979 | A | * | 9/1923 | Sherman | A01M 31/06 43/3 |
| 1,469,613 | A | | 10/1923 | Bailey | |
| 1,831,286 | A | * | 11/1931 | Chelini | A01M 31/06 43/3 |
| 2,227,242 | A | * | 12/1940 | Boutin | A01M 31/06 43/3 |
| 2,268,963 | A | | 1/1942 | Riddell | |
| 2,391,475 | A | * | 12/1945 | Newhardt | A01M 31/06 43/3 |

(Continued)

FOREIGN PATENT DOCUMENTS

| CA | 1050268 | 3/1979 |
|---|---|---|
| CA | 2391478 A1 | 12/2003 |

(Continued)

*Primary Examiner* — Darren W Ark
(74) *Attorney, Agent, or Firm* — Morriss O'Bryant Compagni Cannon, PLLC

(57) ABSTRACT

A method of simulating feeding movement of a waterfowl decoy in a body of water includes rotating a shaft of a motor of the decoy from a resting position to a first feeding position to cause the decoy to move from a horizontal position to a vertical position, from the first feeding position to a second feeding position to cause the decoy to move from the vertical position to a position between the horizontal position and the first feeding position, from the second feeding position to the first feeding position to cause the body of the decoy to move from the position between the horizontal position and the first feeding position back to the vertical position, and from the first or second feeding position back to the resting position thereby causing the body of the decoy to move back to the resting position.

20 Claims, 13 Drawing Sheets

(56) References Cited

U.S. PATENT DOCUMENTS

| | | | | |
|---|---|---|---|---|
| 2,434,335 | A * | 1/1948 | Signalness | A01M 31/06 43/3 |
| 2,457,295 | A * | 12/1948 | Woodhead | A01M 31/06 43/3 |
| 2,536,736 | A | 1/1951 | Gazalski | |
| 2,591,554 | A * | 4/1952 | Kinney | A01M 31/06 43/3 |
| 2,663,108 | A * | 12/1953 | Dixon | A01M 31/06 43/3 |
| 2,691,233 | A | 10/1954 | Richardson | |
| 2,793,456 | A * | 5/1957 | Argo | A01M 31/06 43/3 |
| 2,799,960 | A | 7/1957 | Riley | |
| 2,814,898 | A * | 12/1957 | Fluke | A01M 31/06 43/3 |
| 2,849,823 | A | 9/1958 | Miller | |
| 2,932,916 | A * | 4/1960 | Strickland | A63H 23/08 446/156 |
| 3,000,128 | A | 9/1961 | McAda | |
| 3,010,251 | A * | 11/1961 | Derdowski | A63H 23/04 446/155 |
| 3,059,368 | A * | 10/1962 | Wortman | A01M 31/06 43/3 |
| 3,350,808 | A | 11/1967 | Mitchell | |
| 3,434,234 | A * | 3/1969 | Schleter | A63H 23/10 446/158 |
| 3,713,250 | A * | 1/1973 | Clough, Jr. | A63H 23/00 446/155 |
| 3,869,823 | A | 3/1975 | Powers et al. | |
| 3,916,553 | A | 11/1975 | Lynch et al. | |
| 3,927,485 | A * | 12/1975 | Thorsnes, Jr. | A01M 31/06 43/3 |
| 4,082,063 | A * | 4/1978 | Strickland | A01K 63/006 119/254 |
| 4,198,780 | A * | 4/1980 | Kubiatowicz | A63H 23/10 446/156 |
| 4,322,908 | A | 4/1982 | McCrory | |
| 4,435,913 | A | 3/1984 | Messina | |
| 4,535,560 | A | 8/1985 | O'Neil | |
| 4,566,214 | A | 1/1986 | McCrory et al. | |
| 4,599,819 | A | 7/1986 | Voges, Jr. et al. | |
| 4,713,037 | A * | 12/1987 | Tong | A63H 13/12 446/156 |
| 5,036,614 | A | 8/1991 | Jackson | |
| 5,377,439 | A | 1/1995 | Roos et al. | |
| 5,459,958 | A | 10/1995 | Reinke | |
| 5,608,984 | A | 3/1997 | Shaffer | |
| 5,775,022 | A | 7/1998 | Sumrall et al. | |
| 5,930,936 | A | 8/1999 | Parr et al. | |
| 6,070,356 | A | 6/2000 | Brint et al. | |
| 6,079,140 | A | 6/2000 | Brock, IV | |
| 6,088,944 | A * | 7/2000 | Jones | A63H 23/10 43/3 |
| 6,212,816 | B1 | 4/2001 | Babbitt et al. | |
| 6,412,209 | B1 * | 7/2002 | Kapraly | A01M 31/06 43/3 |
| 6,412,210 | B1 * | 7/2002 | Horrell | A01M 31/06 43/3 |
| 6,442,885 | B1 | 9/2002 | Payne | |
| 6,553,709 | B1 * | 4/2003 | Owen | A01M 31/06 43/3 |
| 6,643,971 | B2 * | 11/2003 | Daniels | A01M 31/06 43/3 |
| 7,028,429 | B1 | 4/2006 | Druliner | |
| 7,272,905 | B1 | 9/2007 | Horton | |
| 7,287,352 | B1 | 10/2007 | Kirby | |
| 7,322,144 | B2 * | 1/2008 | Brewer | A01M 31/06 43/3 |
| 7,472,508 | B2 | 1/2009 | Myers, IV | |
| 7,493,723 | B2 | 2/2009 | Hess | |
| 7,841,123 | B2 | 11/2010 | Walker | |
| 7,874,093 | B2 | 1/2011 | Rohrke | |
| 7,941,963 | B2 | 5/2011 | Myers, IV | |
| 7,975,422 | B2 | 7/2011 | Elliott et al. | |
| 8,266,836 | B2 | 9/2012 | Ware et al. | |
| 8,276,308 | B1 | 10/2012 | Jones et al. | |
| 8,479,436 | B2 | 7/2013 | Elliott et al. | |
| 8,919,028 | B2 * | 12/2014 | Young | A01M 31/06 43/3 |
| 8,950,103 | B2 * | 2/2015 | Bullerdick | A01M 31/06 43/3 |
| 9,253,974 | B2 * | 2/2016 | Baskfield | A01M 31/06 |
| 9,635,850 | B2 * | 5/2017 | Bourlet | A01M 31/06 |
| 9,756,847 | B1 * | 9/2017 | Williams | F16H 57/02 |
| 10,194,654 | B2 * | 2/2019 | Hanson | A01M 31/06 |
| 10,231,448 | B2 * | 3/2019 | Hanson | A01M 31/06 |
| 11,083,189 | B1 * | 8/2021 | Baskfield | A01M 31/06 |
| 2001/0024924 | A1 * | 9/2001 | Ueno | A63H 3/28 446/153 |
| 2002/0178639 | A1 | 12/2002 | Daniels | |
| 2003/0037477 | A1 | 2/2003 | Wood | |
| 2004/0010957 | A1 * | 1/2004 | Corbiere, Jr. | A01M 31/06 43/3 |
| 2004/0025400 | A1 | 2/2004 | Salato | |
| 2004/0211106 | A1 | 10/2004 | Solomon | |
| 2005/0022440 | A1 | 2/2005 | Pinkston | |
| 2005/0091904 | A1 | 5/2005 | Sullivan | |
| 2005/0144828 | A1 | 7/2005 | Lewis et al. | |
| 2006/0207158 | A1 | 9/2006 | Brewer | |
| 2008/0028664 | A1 | 2/2008 | Anthony | |
| 2008/0115399 | A1 | 5/2008 | Walker | |
| 2008/0172920 | A1 | 7/2008 | Brint et al. | |
| 2008/0172921 | A1 | 7/2008 | Wabnitz | |
| 2009/0084018 | A1 | 4/2009 | Elliott et al. | |
| 2009/0113781 | A1 | 5/2009 | Myers, IV | |
| 2009/0151217 | A1 | 6/2009 | Gregory | |
| 2009/0188148 | A1 | 7/2009 | Orris et al. | |
| 2009/0272020 | A1 | 11/2009 | Bill | |
| 2011/0146132 | A1 | 6/2011 | Young | |
| 2011/0219660 | A1 | 9/2011 | Brestal et al. | |
| 2012/0073180 | A1 | 3/2012 | Elliott et al. | |
| 2012/0090217 | A1 | 4/2012 | Young | |
| 2013/0014422 | A1 | 1/2013 | Bullerdick et al. | |
| 2013/0239454 | A1 | 9/2013 | Szechenyi et al. | |
| 2014/0259860 | A1 | 9/2014 | Baskfield et al. | |
| 2014/0298706 | A1 * | 10/2014 | Turner | A01M 31/06 43/2 |
| 2017/0049095 | A1 * | 2/2017 | Hanson | A01M 31/06 |
| 2017/0231218 | A1 * | 8/2017 | Turner | A01M 31/06 43/2 |
| 2017/0280707 | A1 | 10/2017 | Hanson | |
| 2021/0186003 | A1 * | 6/2021 | Denmon | A01M 31/06 |
| 2021/0244014 | A1 * | 8/2021 | Furness | A01M 31/06 |

FOREIGN PATENT DOCUMENTS

| | | |
|---|---|---|
| CA | 2391478 C | 9/2005 |
| CA | 2638881 | 4/2009 |

* cited by examiner

WATERFOWL DECOY

CROSS-REFERENCE TO RELATED APPLICATIONS

The present application is a continuation-in-part of U.S. patent application Ser. No. 15/628,511 filed on Jun. 20, 2017, which is a continuation of U.S. patent application Ser. No. 15/239,330 filed on Aug. 17, 2016, which claims priority to U.S. Provisional Patent Application Ser. No. 62/205,916 filed on Aug. 17, 2015, the entirety of each of which is incorporated by this reference.

BACKGROUND

Field of the Invention

The present invention relates generally to waterfowl decoys used by hunters and more specifically to a method of operating a waterfowl decoy that to simulate a feeding motion while floating upon a body of water.

Description of the Related Art

Ducks mostly feed in shallow bodies of water where they are able to tip their bodies forward putting their heads and breasts underwater and forage on the bottom of the water body for insects and vegetation, commonly referred to as a "dabbling duck." As they forage they move or kick with their feet in the water to propel them in the water. The tail of a waterfowl that is visible above the water surface also moves as the duck forages for food. This motion creates movement on the water surface resulting in surface ripples or small waves around the body of the duck.

Various attempts have been made in the art to provide a decoy that can simulate the feeding motion of waterfowl in a body of water. Such attempts, however, have failed to provide a free-floating decoy that is self contained and capable of remote operation while simulating a realistic feeding motion. One common arrangement of a decoy configured for attempting to simulate a dabbling duck utilizes a cable and pulley system, such as shown in U.S. Pat. No. 2,457,295 to Woodhead, which requires a line to be pulled by the hunter to cause the head of the decoy to bob in the water. The device, however, also requires an anchor that is positioned in the water below the decoy.

Other decoy devices require the decoy to be coupled to a stake that provides a rigid object against which the decoy can articulate. U.S. Pat. No. 2,434,355 to Signalness discloses such a decoy. Similar to the device disclosed by Woodhead, however, the decoy remains relatively fixed in place and must be staked in another location if it is desirable to move the decoy.

Various weight systems provide a counterbalance to a decoy that can float on water. U.S. Pat. No. 2,591,554 to Kinney et al. discloses a decoy with a movable weight. The weight is suspended from the body of the decoy. The weight can be pivoted from a position below the body of the decoy to a position in front of the body of the decoy to cause the decoy to move from an upright position to a feeding position. The weight is actuated by a continuous drive motor that causes the decoy to move between these two positions in a regular and steady fashion. Such motion, however, does not accurately and realistically simulate the motion of a dabbling duck.

The present invention provides a decoy that is capable of simulating a dabbling duck on the surface of a body of water to not only simulate the tail motion of a dabbling duck, but to cause surface ripples in the water surrounding the decoy to provide a realistic simulation of a dabbling duck.

SUMMARY OF THE INVENTION

A waterfowl decoy according to the principles of the present invention is configured to mimic the feeding movement and motions of a puddle duck or dabbling duck. The waterfowl decoy of the present invention mimics this motion by using a programmed microprocessor connected to a small motor that may be a waterproof servomotor or a motor encased in a waterproof container. The motor creates a pivot point against the weight of the battery assembly or other mass to cause the decoy body to move in the water. When the head and front end of the decoy are completely submerged, the motor receives new commands from the microprocessor to move quickly back and forth. This simulates the feeding movements of the duck that is foraging underwater. Waves or ripples are created at the surface of the water and the tail of the decoy moves back and forth to simulate a real dabbling duck. After several movements or "kicks", the microprocessor sends a new signal and the decoy returns to an upright position on the water surface. The decoy then rests on the surface for a few seconds then repeats the feeding cycle.

In one embodiment, a waterfowl decoy comprises a body having a head portion at a front end and a body portion defining an outer surface that simulates a waterfowl. The body portion is at least partially buoyant in water. A motor having a rotatable shaft is coupled to a bottom of the body portion. An elongate member or armature has a first end coupled to the shaft of the motor. The elongate member is movable by the shaft of the motor between a first position and a second position by corresponding movement of the shaft of the motor from a first rotational position to a second rotational position. A mass is coupled to a second end of the elongate member. The mass has sufficient weight to counterbalance the buoyancy of the body to cause the armature to remain substantially vertical in a body of water when the shaft of the motor is rotated causing the head portion of the decoy to be submerged in the body of water when the head portion is pivoted toward the mass and causing the head portion to raise out of the water when the head portion is pivoted away from the mass.

In another embodiment, the waterfowl decoy has a mass that comprises a battery and further includes wiring along the armature electrically coupling the battery to the motor to supply electrical power to the motor.

In another embodiment, the body defines a channel extending from a bottom of the body portion to the head portion. The channel is positioned in a front half of the body. The body portion forms a sealed air chamber around the channel.

In yet another embodiment, the head portion defines at least one aperture in fluid communication with an interior of the head portion that allows the flow of air and water there through.

In still another embodiment, the body portion defines at least one aperture in fluid communication with the channel that allows the flow of air and water there through.

In another embodiment, the head portion defines a first aperture in a top portion of the head portion and a second aperture in a bottom portion of the head portion.

In still another embodiment, the apertures comprise a plurality of slits, holes or V-shaped apertures positioned on a top portion of the body portion.

In yet another embodiment, a motor housing is coupled to a bottom of the body portion. The shaft of the motor extends through a water resistant seal in the motor housing to prevent water from contacting the motor.

In another embodiment, a remote control receiver is coupled to the body. The receiver is in communication with a wireless remote to receive control signals from the wireless remote to thereby control operation of the motor.

In yet another embodiment, a center of buoyancy of the body is positioned in a back portion of the body.

In another embodiment, the motor is capable of back and forth rotation to cause the elongate member to pivot in a corresponding back and forth manner when the elongate member is in the second position thereby causing the body to simulate a dabbling duck with a tail portion of the body extending out of the body of water.

These and other features and advantages of a waterfowl decoy according to the present invention are described in more detail with reference to the drawings.

BRIEF DESCRIPTION OF THE DRAWINGS

The foregoing summary of the invention and the following detailed description of the illustrated embodiments are better understood when read in conjunction with the appended drawings. For the purpose of illustrating the invention, there is shown in the drawings several exemplary embodiments which illustrate what is currently considered to be the best mode for carrying out the invention, it being understood, however, that the invention is not limited to the specific structures, methods or embodiments disclosed. In the drawings.

Figure 1:
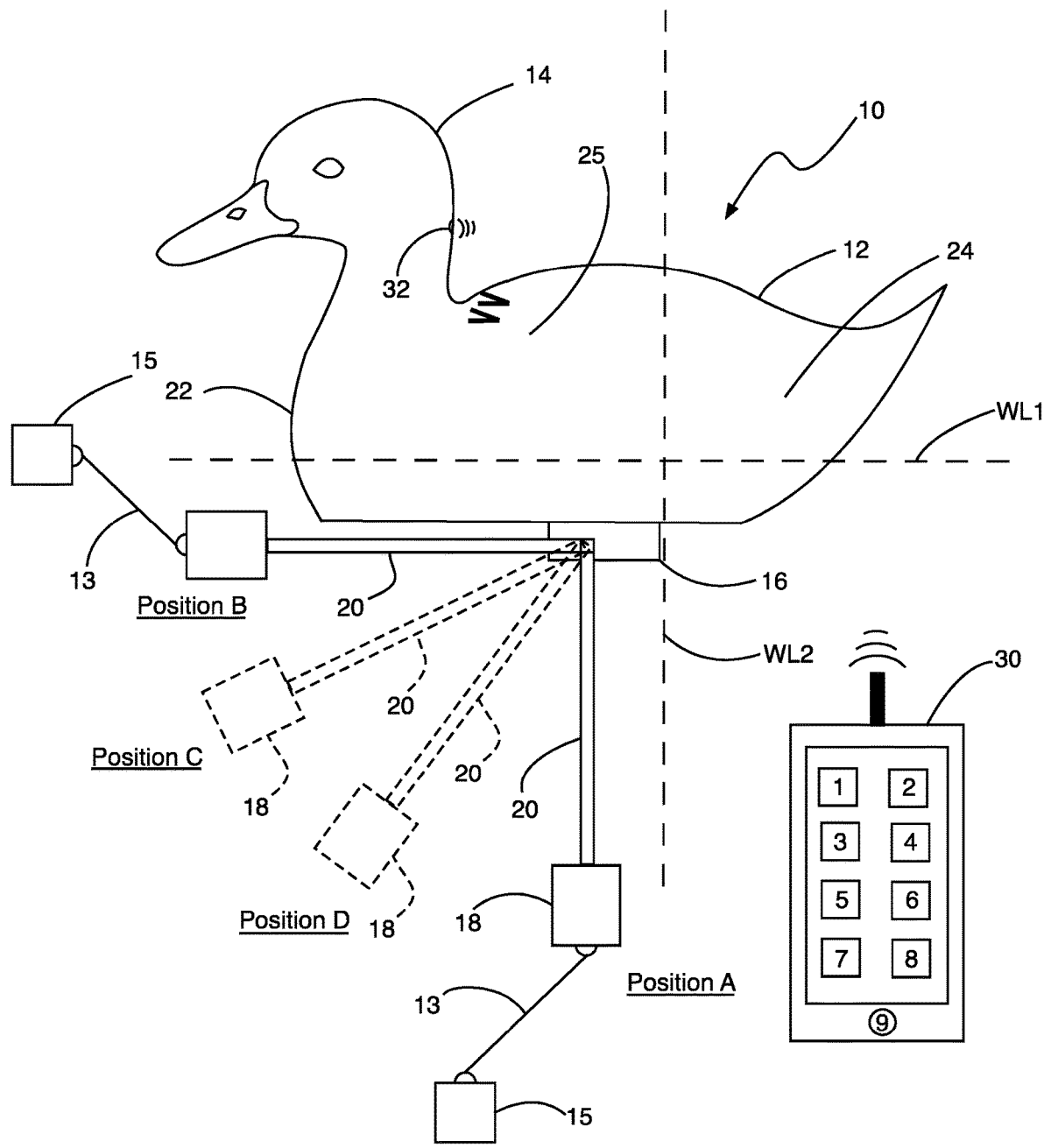
FIG. 1 is a side view of a waterfowl decoy and associated remote control in accordance with the principles of the present invention.

It will be appreciated that the drawings are illustrative and not limiting of the scope of the invention, which is defined by the appended claims. The embodiments shown accomplish various aspects and objects of the invention. It is appreciated that it is not possible to clearly show each element and aspect of the invention in a single figure, and as such, multiple figures are presented to separately illustrate the various details of the invention in greater clarity. Similarly, not every embodiment need accomplish all advantages of the present invention. Elements and acts in the figures are illustrated for simplicity and have not necessarily been rendered according to any particular sequence or embodiment.

DETAILED DESCRIPTION OF THE ILLUSTRATED EMBODIMENTS

The invention and accompanying drawings will now be discussed in reference to the numerals provided therein so as to enable one skilled in the art to practice the present invention. The drawings and descriptions are exemplary of various aspects of the invention and are not intended to narrow the scope of the appended claims. Unless specifically noted, it is intended that the words and phrases in the specification and the claims be given their plain, ordinary, and accustomed meaning to those of ordinary skill in the applicable arts. It is noted that the inventor can be his own lexicographer. The inventor expressly elects, as his own lexicographer, to use only the plain and ordinary meaning of terms in the specification and claims unless they clearly state otherwise and then further, expressly set forth the "special" definition of that term and explain how it differs from the plain and ordinary meaning. Absent such clear statements of intent to apply a "special" definition, it is the inventor's intent and desire that the simple, plain and ordinary meaning to the terms be applied to the interpretation of the specification and claims.

The inventor is also aware of the normal precepts of English grammar. Thus, if a noun, term, or phrase is intended to be further characterized, specified, or narrowed in some way, then such noun, term, or phrase will expressly include additional adjectives, descriptive terms, or other modifiers in accordance with the normal precepts of English grammar. Absent the use of such adjectives, descriptive terms, or modifiers, it is the intent that such nouns, terms, or phrases be given their plain, and ordinary English meaning to those skilled in the applicable arts as set forth above.

Further, the inventor is fully informed of the standards and application of the special provisions of 35 U.S.C. § 112, ¶6. Thus, the use of the words "function," "means" or "step" in the Detailed Description of the Invention or claims is not intended to somehow indicate a desire to invoke the special provisions of 35 U.S.C. § 112, ¶6, to define the invention. To the contrary, if the provisions of 35 U.S.C. § 112, ¶6 are sought to be invoked to define the inventions, the claims will specifically and expressly state the exact phrases "means for" or "step for" and the specific function (e.g., "means for filtering"), without also reciting in such phrases any structure, material or act in support of the function. Thus, even when the claims recite a "means for . . . " or "step for . . . " if the claims also recite any structure, material or acts in support of that means or step, or that perform the recited function, then it is the clear intention of the inventor not to invoke the provisions of 35 U.S.C. § 112, ¶6. Moreover, even if the provisions of 35 U.S.C. § 112, ¶6 are invoked to define the claimed inventions, it is intended that the inventions not be limited only to the specific structure, material or acts that are described in the illustrated embodiments, but in addition, include any and all structures, materials or acts that perform the claimed function as described in alternative embodiments or forms of the invention, or that are well known present or later-developed, equivalent structures, material or acts for performing the claimed function.

In the following description, and for the purposes of explanation, numerous specific details are set forth in order to provide a thorough understanding of the various aspects of the invention. It will be understood, however, by those skilled in the relevant arts, that the present invention may be practiced without these specific details. In other instances, known structures and devices are shown or discussed more generally in order to avoid obscuring the invention. In many cases, a description of the operation is sufficient to enable one to implement the various forms of the invention, particularly when the operation is to be implemented in software. It should be noted that there are many different and alternative configurations, devices and technologies to which the disclosed inventions may be applied. Thus, the full scope of the inventions is not limited to the examples that are described below.

As shown in FIG. 1, the waterfowl decoy 10, configured to replicate a waterfowl, comprises a free-floating decoy having a decoy body 12 and integrated head 14, a motor assembly 16, with a mass 18 and associated elongate, rigid armature 20 coupled to the motor assembly 16. The free-floating decoy 10 is configured to float on top of a body of water, although, the decoy 10 may be tethered to an anchor or weight with line, such as a string, line or small rope. The decoy 10 may be deployed in any depth of water, i.e. about 1 foot to about 20 feet or more. The decoy can successfully operate in any depth of water so long as the depth of the water is sufficient to allow the decoy to tip as described herein without the head 14 of the decoy 10 or the mass 18 getting stuck on the bottom of the body of water as the head 14 of the decoy 10 is moved down into the water and returned back above the water. The decoy 10 may be attached to a tether 13, such as a line, string or small rope, to an anchor or weight 15 that rests on the bottom of the body of water to keep the decoy from drifting away from a general desired location. The tether 13 and weight 15, however, are not required for the decoy 10 to simulate a dabbling duck as herein describe. The tether 13 may be attached to the bottom of the mass 18. The mass 18 includes a battery that is wired to the motor assembly 16 for providing electrical power for the motor. When the mass 18 is located at Position A, the armature 20 and mass 18 hang directly below the decoy body 12. In this position, the decoy 10 floats in an upright/horizontal position on the water, indicated by waterline WL1. In this position, the decoy 12 appears to be sitting on the water. When the armature 20 is moved relative to the body 12, resulting in movement of the front end 22 of the body 12 in the water (i.e., the head 14 of the decoy 10 moves closer to the mass 18) to Position B, the front end 22 of the decoy 10 and the head 14 are caused to lower into the water such that only the tail portion 24 is visible above the waterline as indicated by waterline WL2.

For purposes of this description, the motion of the armature 20 and mass 18 relative to the body 12 of the decoy 10 is described in relative movement between the armature 20 and the body 12. In use in a body of water, however, the armature 20 and mass 18 will remain relatively in place with the armature 20 extending in a substantially vertical direction as the body 12 of the decoy 10 pivots about the top end of the armature when the body 12 and mass are brought closer together or further away from each other. By using a servo, stepper or other electric motor, the armature 20 and mass 18 can be moved relative to the body 12 of the decoy 10 to any desired position between Position A and Position B, such as Position C or Position D as shown in dashed lines. The relative angle of the armature 20 to the body 12 is configured to pivot about 90 degrees, plus or minus about 5 degrees, when moved between Position A and Position B.

A wireless remote 30 may be provided to control the movement of the decoy 10 by communicating through antenna 32 with a microprocessor that is in control of movement of the motor. When an electronic signal is sent from the microprocessor to the motor, the motor is activated and can move the armature 20 at any location between Position A and Position B. The mass has sufficient weight to overcome the buoyancy of the body 12 of the decoy so that the body 12 and head 14 of the decoy in order to move the head 14 and front portion 25 of the body 12 downward into the water when the mass 18 is moved to position B where the tail portion 24 will approximate a vertical position relative to the water. In this position, the motor can be actuated to rapidly move the armature 20 and mass 18 relative to the body 12 between Position B and Position C in order to cause the body 12 to move in the water to simulate a dabbling duck that is feeding with only the tail portion 24 extending above the water line WL2. The angle of movement between Position B and Position C may be between about 1 and 10 degrees. It should be noted herein that the term "about" when used in connection with angles, degrees, dimensions or proximate distances is defined and to be interpreted as being near or approximate to the specified angle, degree, dimension, frequency or proximate distance. For example, and not be way of limitation about 1 degree may be between a number just greater than zero to 2 degrees.

The degree of movement of the armature 20 between Position B and Position C is at a frequency and an angle that with cause the tail portion 24 of the decoy 10 to move relative to the water and correspondingly cause ripples in the water. Because the decoy 10 does not have legs that a real duck uses to move itself in the water when in a feeding position and that cause much of the ripple effect of the water, the decoy 10 of the present invention utilizes tail movement to cause such rippling. Rippling is also a result of head 14 movement as the head 14 nears the surface of the water, thereby causing water displacement at the surface of the water. Movement between Position B and Position C at a frequency of about 1 to 5 Hz is sufficient to cause adequate and realistic rippling of the water around the decoy 10.

The remote 30 is provided with a plurality of buttons 1-8 to control various functions of the decoy 10. Buttons 1 and 2 may provide ON and OFF functionality for the decoy to remotely turn the decoy 10 on or off as desired by the user. Button 3 may cause the decoy 10 to move into a dabbling/feeding position. Button 4 may cause the decoy 10 to return to an upright floating position. Button 5 may place the decoy in an automated mode where the decoy 10 is caused to automatically move between a dabbling and upright position as has been preprogrammed and button 6 may place the decoy 10 in a manual mode. Buttons 7 and 8 may be for controlling the frequency of the dabbling motion and the frequency of movement of the decoy between the upright position and the dabbling position. Button 9 may be an On/Off button for the remote 30. Other control features may also be provided with the remote in addition to or in replacement of any of the foregoing functions. For example, certain buttons may be designated to initiate certain feeding pattern and/or resting protocols. It should also be noted that the remote 30 may comprise an application on a smartphone or other handheld computing device such as a tablet.

Figure 2:
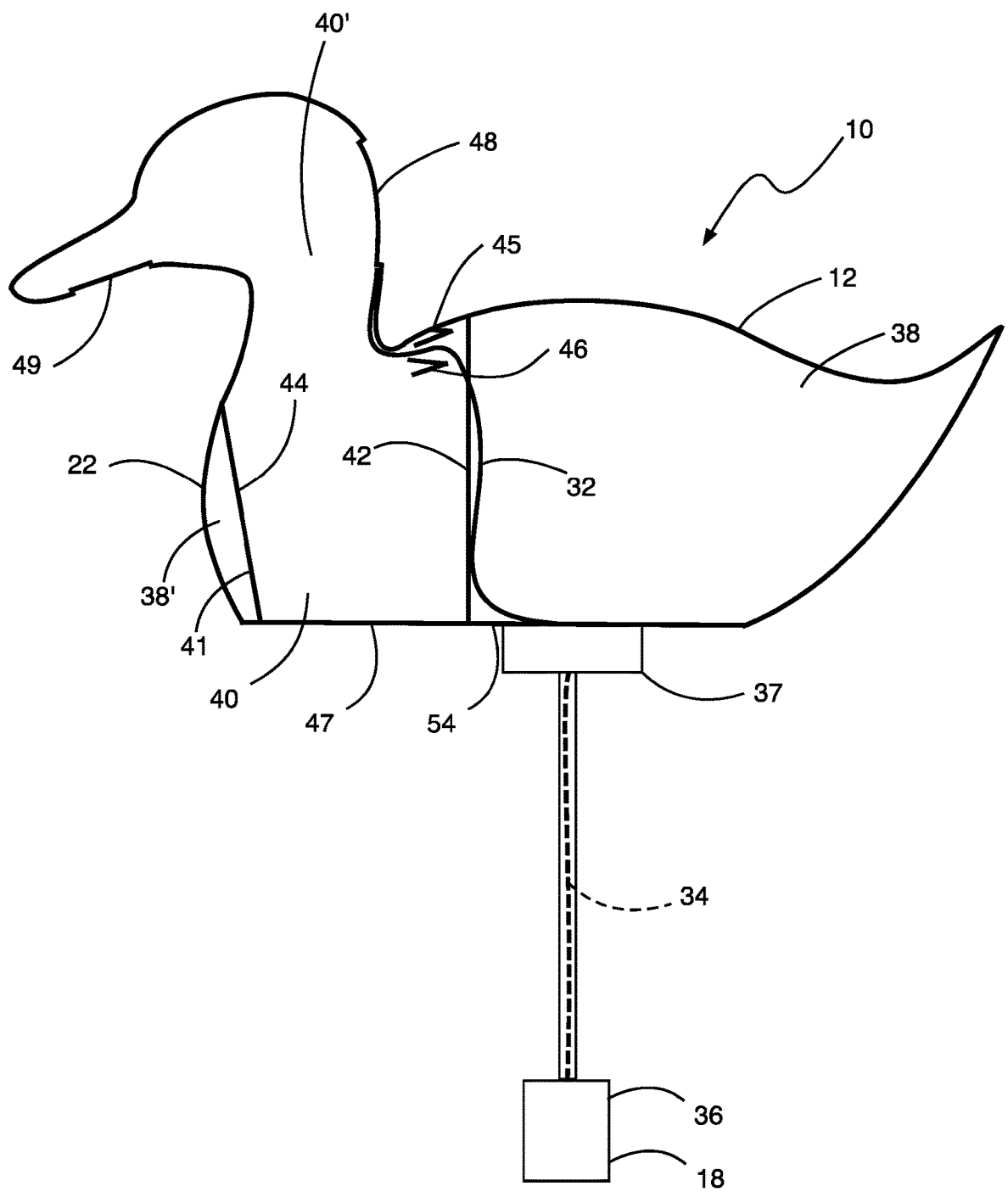
FIG. 2 is a cross-sectional side view of the waterfowl decoy illustrated in FIG. 1.

As shown in FIG. 2, wires 34 extend from the battery compartment 36 that comprises the mass 18 to a motor housing 37. The antenna wire 32 extends through the body 12 of the decoy 10. The body 12 of the decoy 10 includes various enclosed air chambers 38 and 38' (which may be in fluid communication with each other, i.e., part of the same chamber) that provide sufficient buoyancy when the decoy 10 is in a first position simulating a waterfowl sitting on the water when the mass 18 is positioned as shown extending below the decoy body 12 and open channel 40 defined by channel walls 42 and 44 through which air and water can flow when the mass 18 is moved to Position B as shown in FIG. 1. The channel walls 42 and 44 may be formed by a sleeve 41 that is sealed between the neck of the decoy body 12 and the bottom surface of the decoy 12. Similarly, the walls 42 and 44 may be molded into the body 12. The walls 42 and 44 may define a generally cylindrically or frustonically shaped passageway through the body 12 such that the air chamber 38 surrounds the walls 42 and 44. The channel extends from the bottom opening 47 formed in the bottom surface 54 of the body 12 and is in fluid communication with the interior space 40' defined by the neck and head portions of the decoy 12.

Holes or other openings 45, 46, 47, 48 and 49 in the front portion of the decoy allow water to enter the channel 40 while simultaneously allowing air to escape. The holes or openings 45 and 46 may comprise small holes, slits or V-shaped apertures on the back of the decoy that are not very noticeable so as to be disguised and relatively hidden on the surface of the decoy 10. Similarly, slits 48 and 49 are wide enough to allow water to flow through the head portion of the decoy 10 but that retain the general appearance of the decoy 10. The front enclosed chamber portion 38' is sized to provide sufficient buoyancy to the front end 22 of the decoy body 12 to hold the body in a generally horizontal position on the water as show with reference to waterline WL1 of FIG. 1, but that does not prevent the decoy 10 from moving into a feeding position with the body 12 held in a generally vertically position as shown with reference to waterline WL2 of FIG. 1. When the decoy 10 is tipped to Position B as shown in FIG. 1 with reference to waterline WL2, water can enter the opening 49 in the head of the decoy 10 as air in the chamber 40' escapes through opening 48 in the back of the head of the decoy 10. Similarly, air in the chamber 40 defined by walls 42 and 44 can escape through the openings 45 and 46 as water fills the chamber 40. When the mass 18 is then returned to Position A as shown in FIG. 1, water in the head portion and the chamber 40 flows out of openings 47 and 49 as air enters openings 45, 46, 48 and 49.

Figure 3:
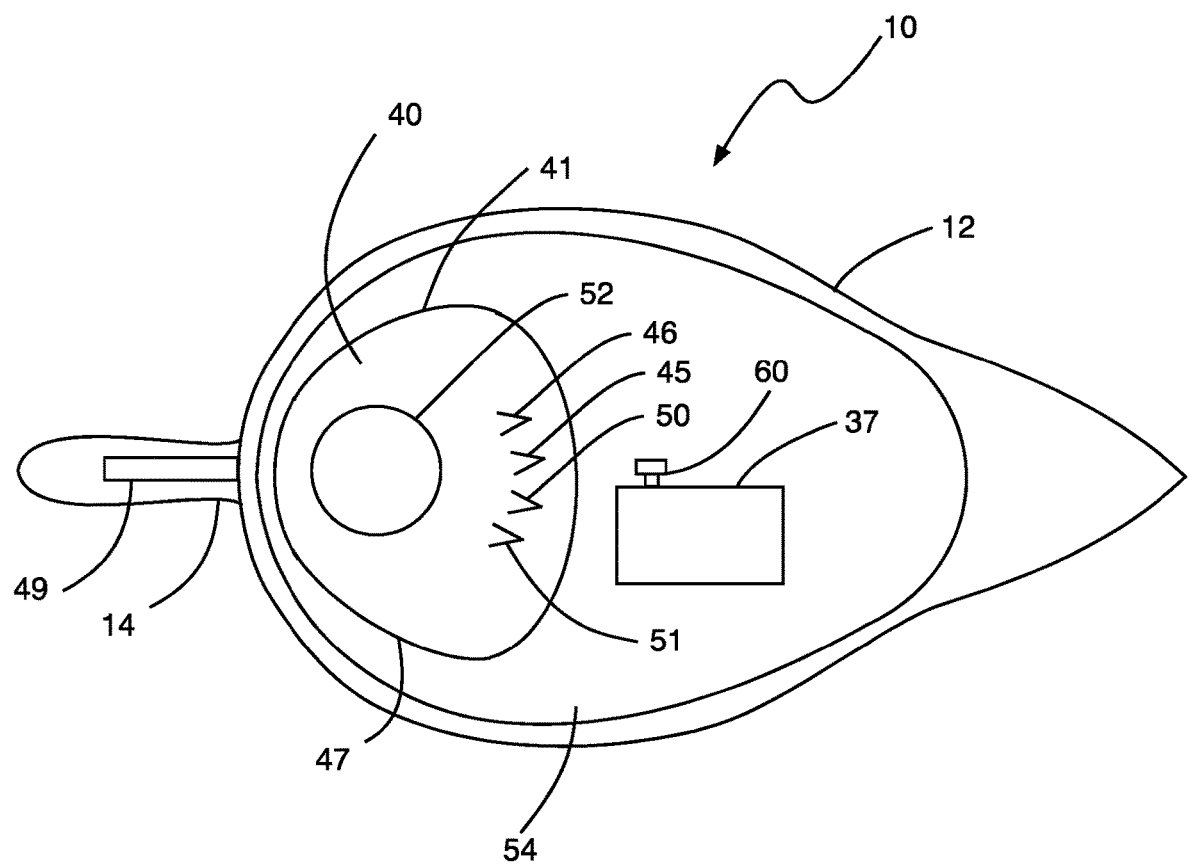
FIG. 3 is a bottom side view of the waterfowl decoy illustrated in FIG. 1.
Figure 4:
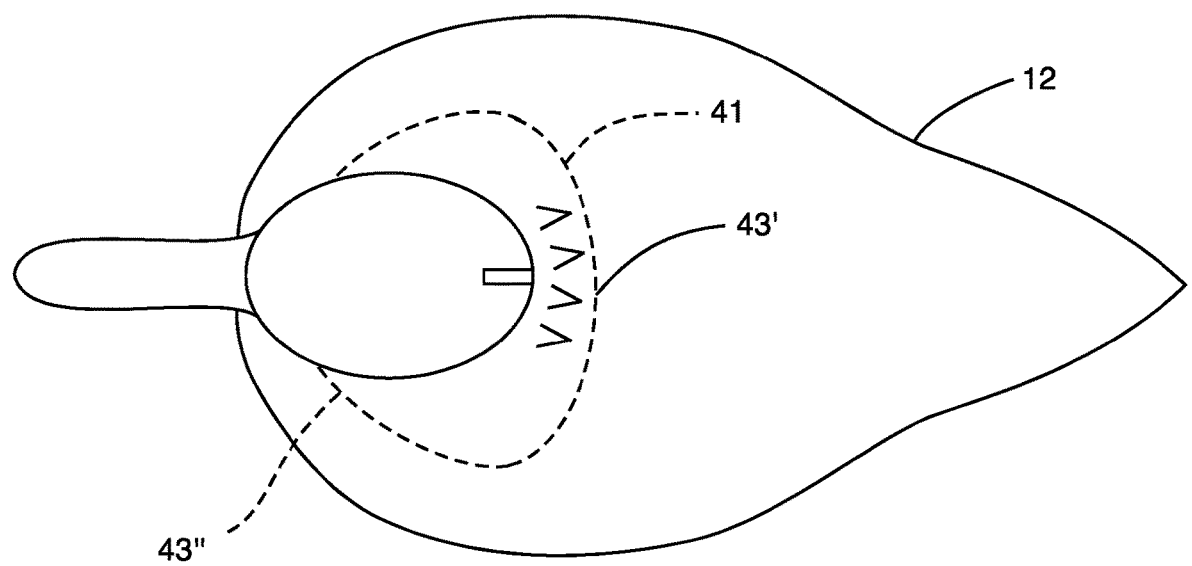
FIG. 4 is a top side view of the waterfowl decoy illustrated in FIG. 1.

As further shown in FIG. 3, the channel 40 extends from a relatively large opening 47 through the neck 52 of the decoy and into the head 14. Thus, the channel 40 is in fluid communication with the interior of the neck 52 and head 14 of the decoy 10. The channel 40 is also in fluid communication with the openings 45, 46, 47, 48 (not visible), 49, 50 and 51. The channel 40 is formed by the sleeve 41 the that extends from the opening 47 and is sealed to the bottom 54 of the decoy body 12 at one end and, as shown in FIG. 4, is sealed to inner surfaces of the decoy body 12 from the back 43' of the decoy body 12 to the front 43" of the neck opening of the decoy body 12. The position of the channel 40 through the decoy 10 is forward of a center of buoyancy of the decoy 10. The center of buoyancy is the center of the buoyant force of the decoy body 12 due to the positioning of air chamber 38 relative to the body 12. Here, the majority of the air chamber 38 is positioned in the back half of the decoy body 12 to cause the tail end of the decoy body 12 to be more buoyant than the front half of the decoy body 12. The front half of the decoy body 12 is still somewhat buoyant due to the air chamber 38' that extends around the chamber 40. That way, when the mass 18 is positioned below the decoy body 12, the front portion of the decoy 10 is buoyant enough to hold the decoy body 12 in an upright position but less buoyant than the back half of the decoy body 12 so that when the front portion of the decoy body 12 is tipped into the water, the weight of the mass 18 is sufficient to overcome the buoyant force of the front portion of the decoy body 12.

Referring again to FIG. 3, the motor housing 37 is attached to the bottom surface 54 of the decoy 12. A shaft 60 of the motor extends from the motor housing 37 to be connected to the armature 20 as shown in FIG. 1. The shaft 60 is positioned proximate a longitudinal center line of the decoy body 12 so that the weight 18 (see FIG. 2) is centrally positioned between the right side and left side of the decoy in order to provide proper left and right balance of the decoy body 12 in water. A watertight seal is provided between the motor housing 37 and the shaft 60 of the motor to prevent water from entering into the motor housing 37 when the motor housing 37 is submerged in water.

Figure 5:
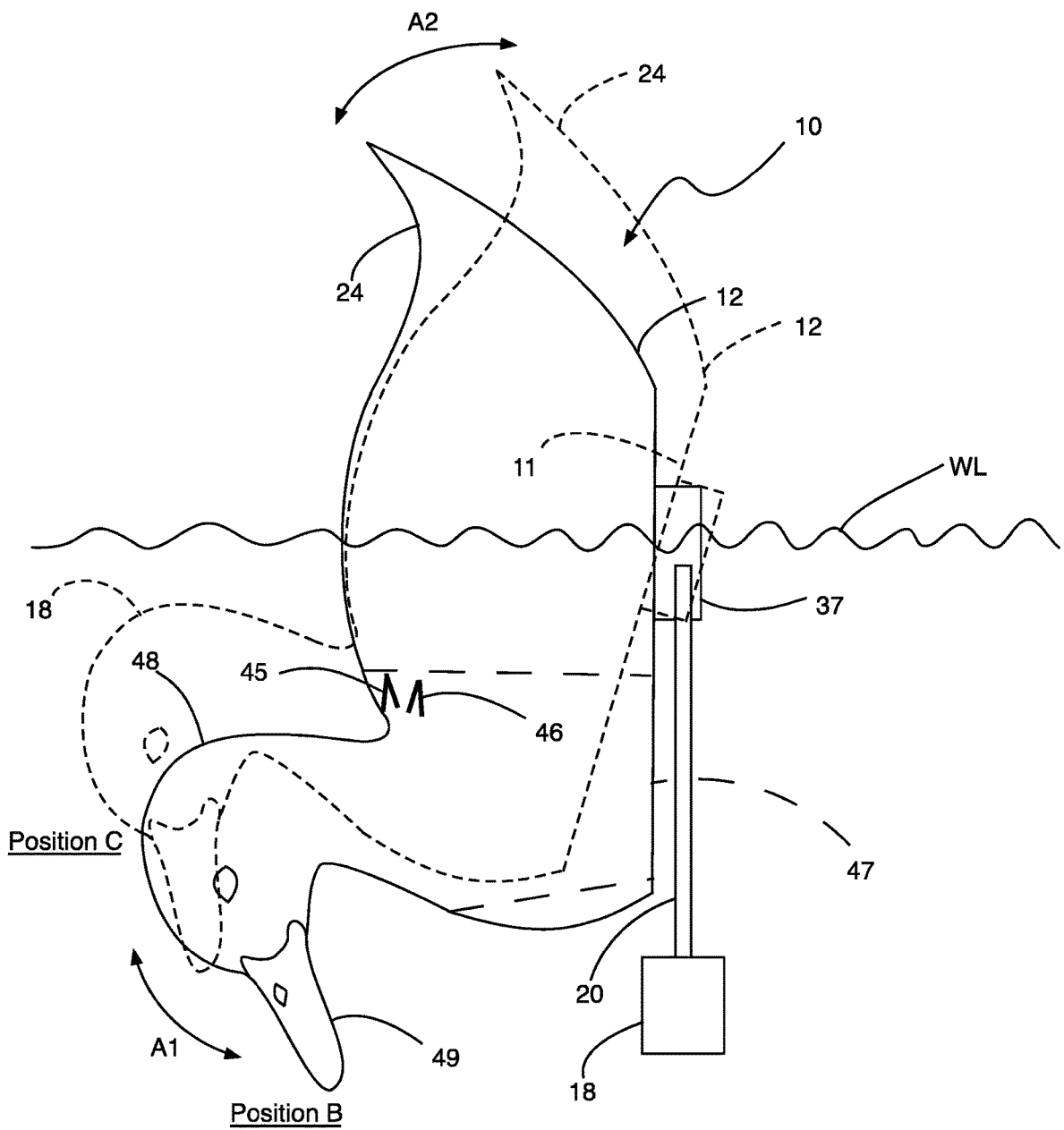
FIG. 5 is a side view of the waterfowl decoy illustrated in FIG. 1 in a simulated feeding position.

Referring now to FIG. 5, when the decoy 10 is in a vertical position relative to the water line WL, the tail portion 24 and back half of the decoy body 12 are the only parts that are above the water line WL. To get in this position, the motor receives a command to rotate the body 12 into a substantially vertical position. In this position, the motor then receives a command to rotate its shaft in a back and forth manner, from a first rotational position to a second rotational position and back again, in relatively rapid succession for several iterations. This causes the body 12 to move relative to the armature 20 and mass 18 between Position B and Position C as indicated by arrow A1. This in turn causes the tail section 24 to oscillate back and forth as indicated by arrow A2 to replicate the motion a duck makes as it forages underwater. Such movement in turn causes rippling of the water line WL. After a few seconds of underwater wiggling the motor returns back to a "zero" position causing the body 12 to rotate back to a horizontal position with the bottom 11 of the body 12 positioned substantially perpendicular to the long axis of the armature 20, as shown in Position A in FIG. 1 so that the decoy 10 returns to the surface of the water (waterline WL1 shown in FIG. 1). In actuality, there will be some movement of the weight 18 and associated armature 20 when the decoy body 12 is moved relative thereto as a result of counter forces and momentum caused by the movement. As the decoy 10 moves from a substantially submerged position with the tail 24 portion exiting the water to a horizontal floating position, water exits the decoy body through the opening 49 under the bill and the larger opening 47 below the breast. At the same time, air enters the decoy body via the slit openings 45, 46 and 48 on the back of the decoy and behind the decoy's head, respectively.

The buoyancy of the decoy body 12 is calculated so that when the decoy 10 is in Position B as shown, the motor housing 37 and thus the armature 20 and mass 18 are mostly positioned below the waterline WL so as to be hidden from view above the water line WL.

Figure 6:
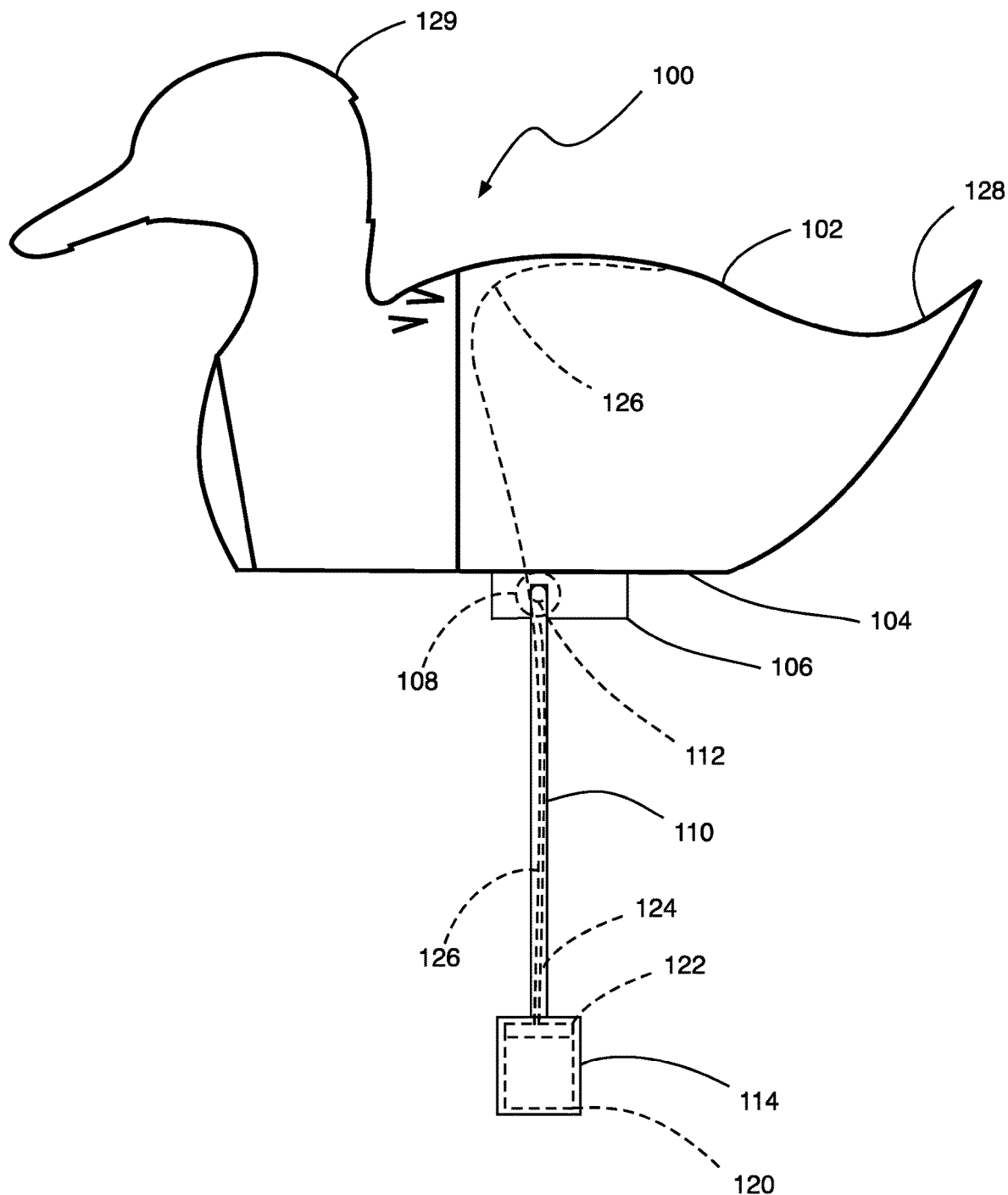
FIG. 6 is a cross-sectional side view of another embodiment of a waterfowl decoy in accordance with the principles of the present invention.

As shown in FIG. 6, a decoy, generally indicated at 100, in accordance with the present invention includes a decoy body 102 having a bottom surface 104 to which a motor housing 106 is attached. A servomotor 108, or other motor known in the art that is capable of controlled back and forth motion, is secured within the motor housing 106. A rigid elongate member 110, such as a tubular shaft, is coupled to the shaft 112 of the motor 108 and thus pivots with movement of the shaft 112 of the motor 108. A watertight battery compartment 114 is coupled to the distal end of the elongate member 110 and houses a battery 120 and one or more microprocessors 122, which may include a microprocessor for communicating through the antenna and a separate microprocessor for controlling the motor 108 or a single microprocessor capable of both communication functions and motor operation. The battery 120 may be a single battery, such as a single 6 Volt battery, or a plurality of other combination of batteries and battery voltages depending on the power needs of the decoy 100 and longevity of operation between battery charges or battery replacement.

Wires 124 and antenna 126 that are coupled to one or more microprocessors 122 extend up through the elongate member 110 and into the motor housing 106. The wires 124 from the microprocessor send control signals to the motor 112 to control movement of the elongate member 110. The antenna wire 126 further extends from the motor housing 106 and into the body 102 of the decoy 100 to a location proximate a back of the decoy that is exposed when the decoy is in a horizontal sitting position as well as when the decoy is in a vertical feeding position. If desired, the antenna may extend into the tail portion 128 of the decoy 100 to ensure that the antenna is never below the water level regardless of the position of the decoy in the water. Conversely, the antenna may extend into the head portion 129.

Figure 7:
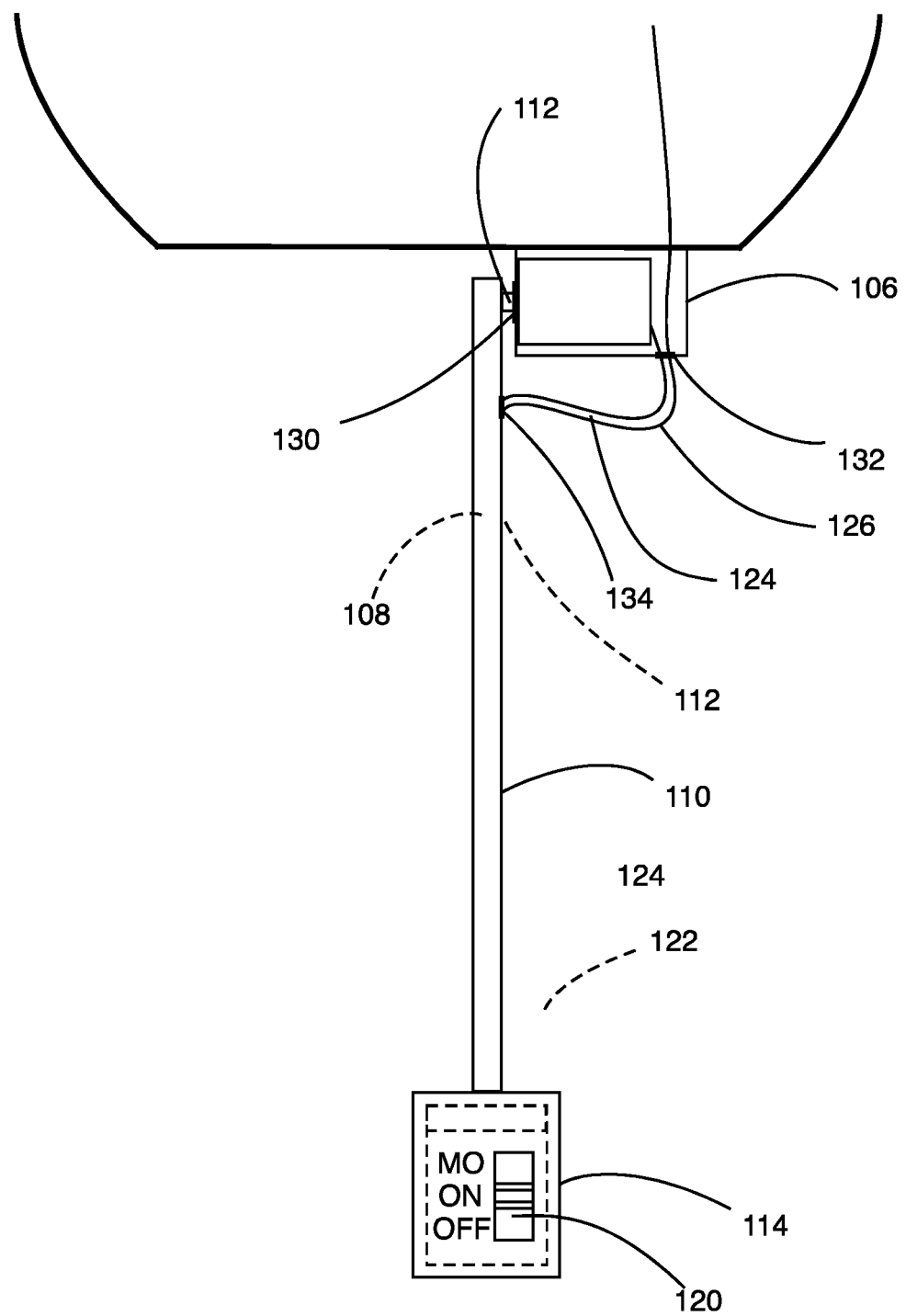
FIG. 7 is a partial back side view of the waterfowl decoy illustrated in FIG. 6.

As further illustrated in FIG. 7, the motor housing 106 is provided with a shaft seal 130 that provides a water tight seal between the shaft 110 and the motor housing 106 to prevent water from entering into the housing 106 when the housing 106 is submerged in water. The housing 106 also includes a seal 132 around the wires 124 and 126 coming from the shaft 110. A similar watertight seal 134 is provided between the wires 124 and 126 where they exit the shaft 110 proximate the motor housing 106. This prevents water from entering the shaft 110 and getting into the battery and microprocessor compartment 114. It should be noted that the motor housing 106 could be positioned on the opposite side of the shaft 110 and simply connected to the opposite side of the shaft 110 while keeping the shaft 110 generally centered relative to the bottom surface of the decoy body. As such, the illustration of FIG. 7 could represent either a back side view or a front side view.

Also, the battery compartment 114 may include a three-way switch 115 on the compartment 114. The switch 115 will have three positions: off, power on and motion on. "Power on" means that the antenna is listening for a signal that can be activated by a hunter in a hunting blind. Or if the remote is lost, broken or otherwise not available, the decoy can be activated by turning the switch to the third position, "motion on" by which the decoy goes into an automatic motion mode of operation. While the battery compartment 114 is a sealed enclosure, it may include a door to access and/or remove the battery contained therein for charging or battery replacement/exchange.

Figure 8:
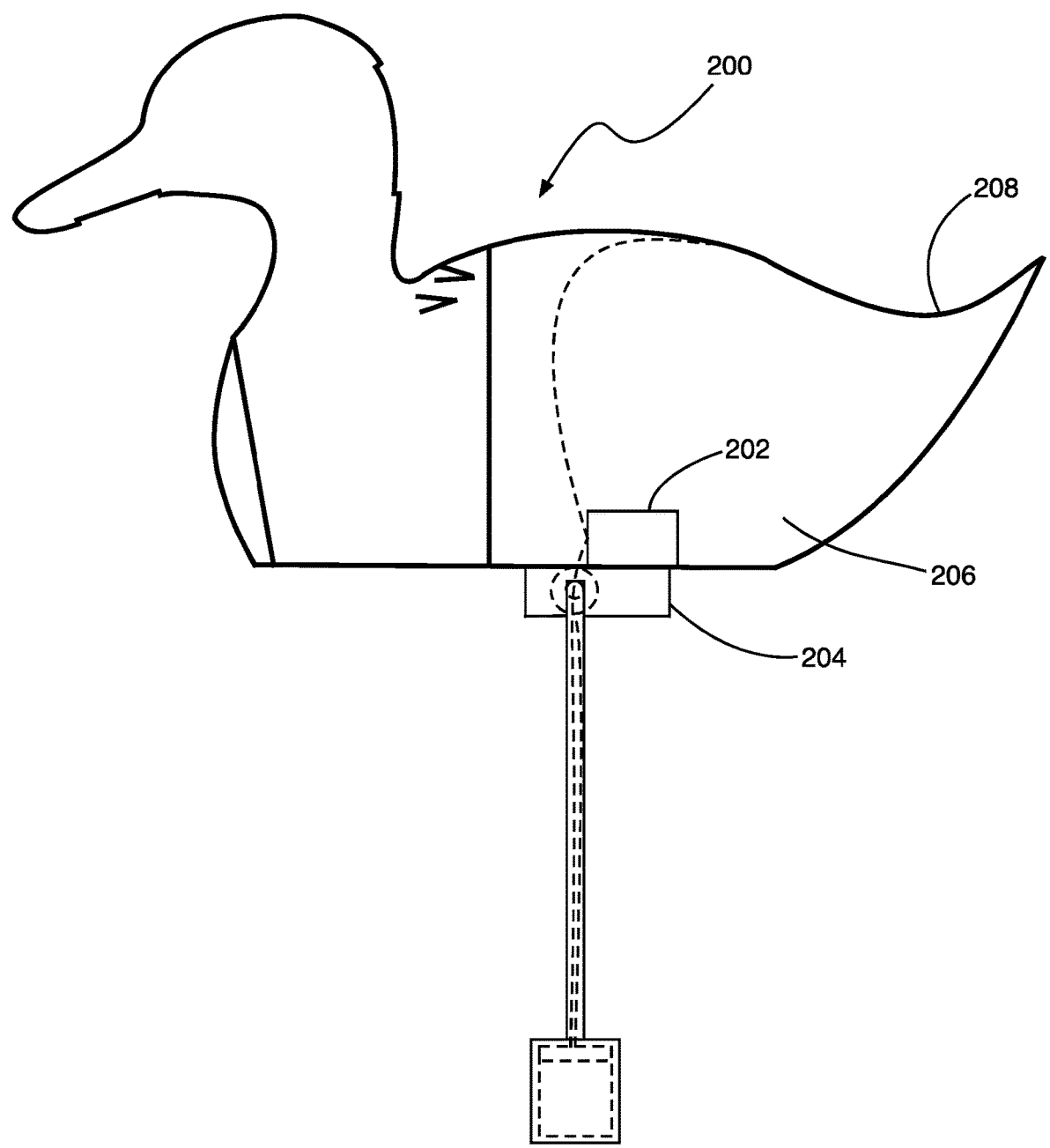
FIG. 8 is a cross-sectional side view of yet another embodiment of a waterfowl decoy in accordance with the principles of the present invention.

FIG. 8 illustrates an alternative embodiment of a decoy, generally indicated at 200, in accordance with the principles of the present invention. The decoy 200 is configured in a similar manner to the decoy 100 shown in FIG. 7 but the microprocessor 202 is located above the motor housing 204 inside the airtight sealed compartment 206 of the decoy body 208. As such, the microprocessor not likely to be exposed to water since its housing is never submerged during use of the decoy as previously discussed and described.

Figure 9:
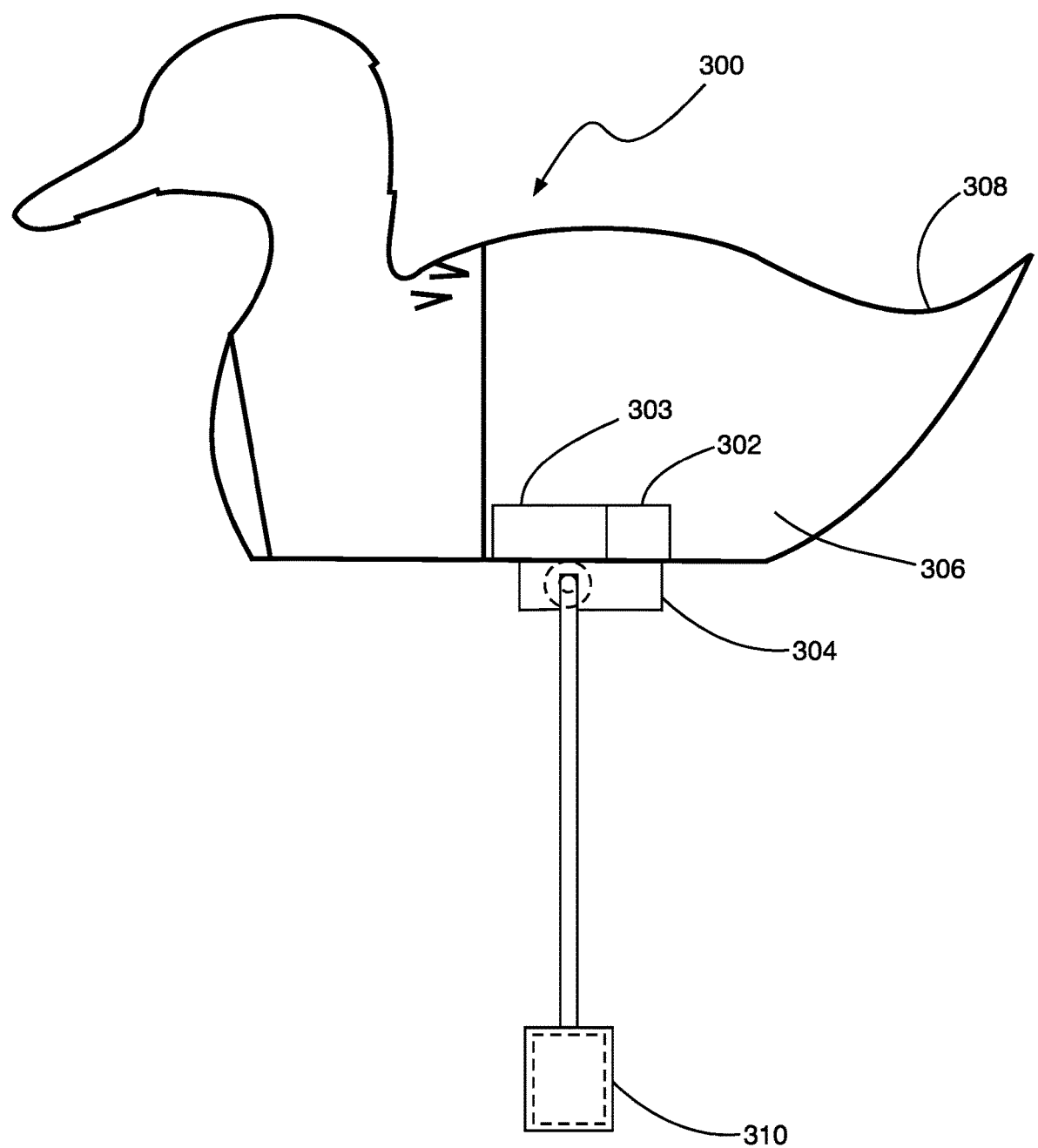
FIG. 9 is a cross-sectional side view of another embodiment of a waterfowl decoy in accordance with the principles of the present invention.

Likewise, in FIG. 9, a decoy, generally indicated at 300, in accordance with the principles of the present invention is configured in a similar manner to the decoy 200 shown in FIG. 8 but the microprocessor 302 and battery 303 located above the motor housing 304 inside the airtight sealed compartment 306 of the decoy body 308. As such, the microprocessor and battery are not likely to be exposed to water since the microprocessor and battery are never submerged during use of the decoy as previously shown and described. In this case, the mass 310 is simply a weight of sufficient mass to operate the decoy as previously shown and described. Moreover, because of the added weight, primarily from the battery 303, to the body 308 of the decoy 300, the size of the chamber 306 may need to be increased and/or distribution of buoyancy chambers may need to be altered in order to increase and/or shift the buoyancy of the decoy to offset this added weight of the battery to the body 308 of the decoy 300.

Moreover, in this embodiment, the decoy 300 operates in an autonomous mode. That is, the decoy 300 is not controllable by remote control. Rather, the microprocessor 302 is preprogrammed with instructions to operate the motor to simulate a feeding duck. That is, the microprocessor 302 may cause the motor to pivot the body 308 relative to the mass 310 from a horizontal position as shown to a substantially vertical position by turning the shaft of the motor ¼ of a turn. This ¼ turn happens in about 1 second or less to simulate the diving action of the head of the duck. Once in this position, the motor will oscillate plus and minus a fraction of a turn (e.g., about 1 percent to about 6 percent of a turn of the shaft of the motor, 5 to 30 degrees), in rapid succession (e.g. about 0.1 seconds to about 0.5 seconds) for about 2 to 10 seconds and then rotate back ¼ turn to move the decoy back to a resting horizontal position on the body of water. This cycle is repeated in set or random time intervals (e.g., 2, 3, 5, 7, 10, 20, 30, 60, 120 second intervals) with the decoy engaging in a feeding motion for a period of time (e.g., 1-10 seconds) and then returning to a resting position for another period of time (e.g., 1-120 seconds). The frequency of movement in the feeding position may be about 1 to 4 oscillations per second, with the time intervals for each set of oscillations simulating feeding being in a constant repeating pattern or a random pattern. By randomizing the various time intervals or at least having a repeating pattern with varying time intervals within the pattern, the decoy can be made to appear to be engaging in more realistic feeding patterns.

Figure 10:
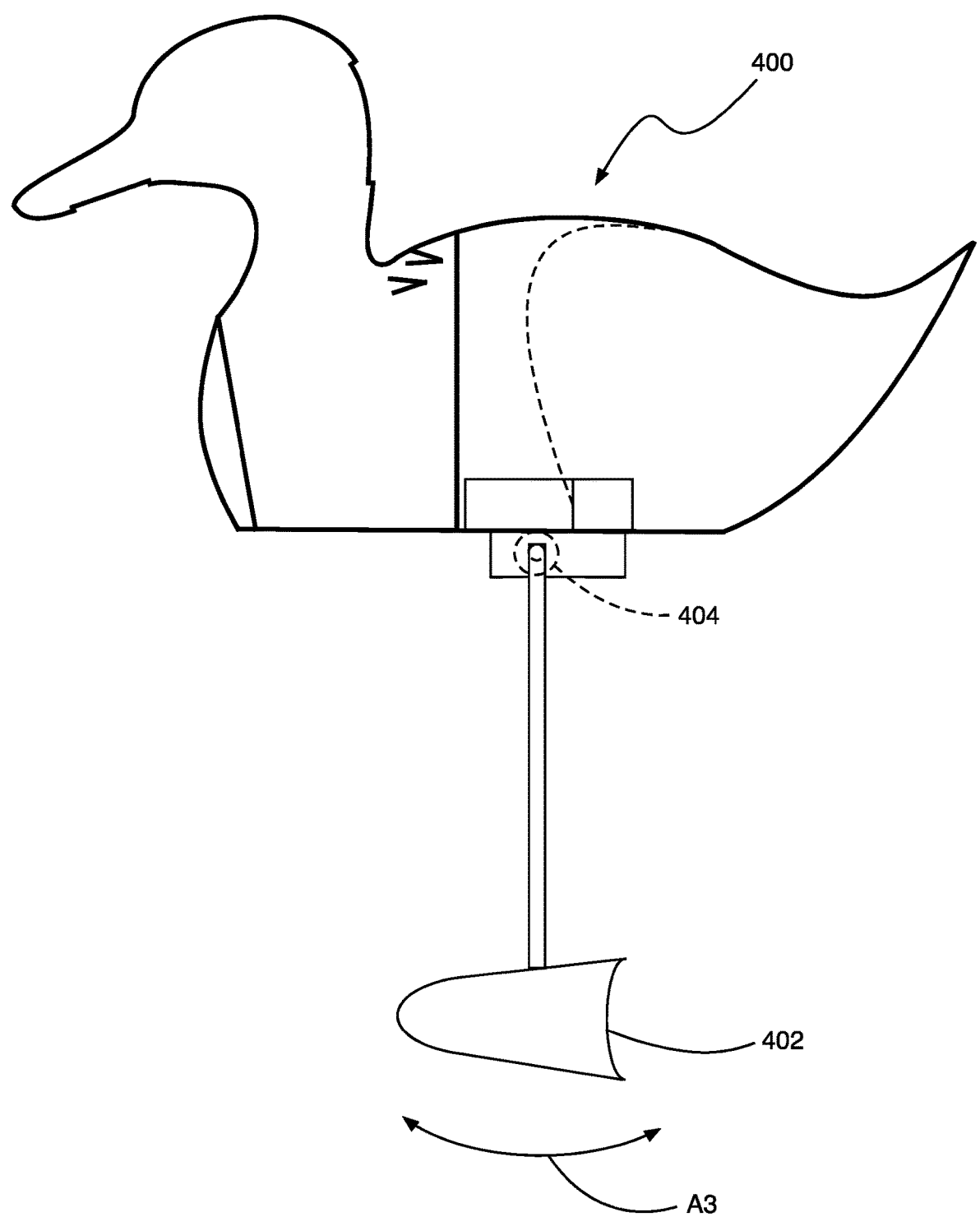
FIG. 10 is a cross-sectional side view of yet another embodiment of a waterfowl decoy in accordance with the principles of the present invention.

As shown in FIG. 10, it may also be possible to propel the decoy 400 by moving the mass 402 back and forth with the motor 404, as indicated by arrow A3, in the water when the mass 402 is positioned below the decoy 400 as shown. By altering the shape of the mass 402 to have a front end that is more streamlined and a back end that is more resistant to movement in the water, movement of the mass in a back and forth manner as shown by arrow A3 will cause the decoy 400 to be propelled in a forward direction. This could help to deploy the decoy initially by setting the decoy 400 in the water generally facing in a desired direction of deployment. The motor 404 could then be actuated to propel the decoy 400 to a desired location before changing the operation of the decoy to one of feeding as previously described. String, line or rope retrieval of the decoy could then be used to retrieve the decoy 400 after deployment.

Figure 11:
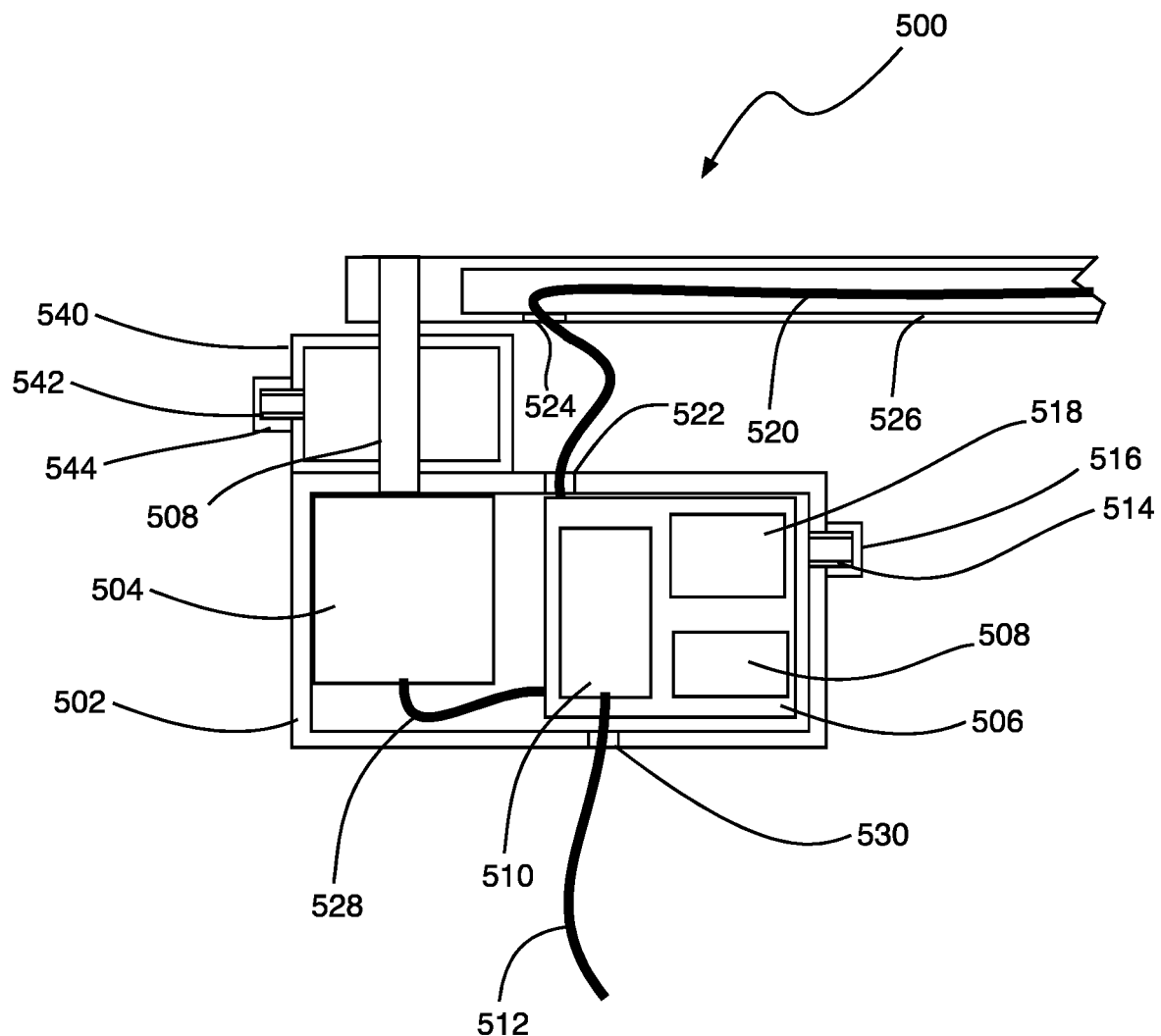
FIG. 11 is a partial cross-sectional top of a motor assembly for a waterfowl decoy in accordance with the principles of the present invention.

FIG. 11 there is disclosed a motor assembly, generally indicated at 500 in accordance with the principles of the present invention. The motor assembly 500 comprises a motor housing 502 within which a motor 504 is mounted.

The motor 504 is electrically coupled to and controlled by a motor control circuit 506. The motor 500 may comprise a servomotor, a stepper motor, or other motors known in the art capable of relatively precise back and forth controlled rotational movement of the shaft 508 of the motor 502. The motor control circuit 506 includes a processor 508 that is programmed with a motor control pattern for operating the motor 504 in a manner that causes the decoy to simulate a feeding duck, to propel the decoy. The processor 508 may include a timing circuit so that placing the decoy in a feeding simulation mode is intermittent based upon observed rates of real ducks. That is, the feeding simulation of the processor 508 may include uneven or more random feeding patterns to better simulate the feeding habits of real ducks. The motor control circuit 506 further includes a wireless communication device 510 or transceiver that can receive control signals from the user via a wireless device, such as the wireless remote shown in FIG. 1. The wireless communication device may operate via RF signals or other wireless signals known in the art. An antenna 512 is electrically coupled to the wireless communication device 510. The circuit 506 also includes a battery charging port 514 that includes a waterproof cap 516 and a rechargeable charging circuit 518. When in the charging mode, the wires 520 connected to the battery (not shown) send electrical current to charge the battery. Seals 522 and 524 are provided in the housing 502 and armature 526, respectively, to seal around the wires 520 and prevent water from entering the housing 502 or the central aperture of the armature 526. The wires 520 are also connected to the motor control circuit 506 to provide power from the battery to the motor through wires 528. A seal 530 is also provided in the housing wall to seal around the antenna 512.

In order to prevent water from entering the housing 502, which could damage the motor 504 and the motor control circuit 506, the shaft 508 of the motor passes through a "stuffing box" 540 that is filled with grease or petroleum wax. The box 540 defines a space around the shaft 508 so that the grease or wax is in complete contact with the shaft and fills any space between the shaft 508 and the opening in the box 540 through which the shaft passes. The grease or wax prevents water from flowing into the motor housing 502, thus providing a waterproof seal between the motor shaft 508 and the box 540. The box 540 is also provided with a grease port 542 for adding grease or wax to the box 540 if needed. A watertight cap 544 is provided to cover the grease port 542.

The shaft 508 is fixedly mounted to the armature 526 as by press fitting, mechanical attachment, adhesive attachment, chemical attachment or integral formation so that movement of the shaft 508 correlates to direct movement of the armature 520. Depending on the rate of rotation of the shaft 508 of the motor due to the type of motor used, it is also contemplated that a gear box may be used between the shaft 508 of the motor 504 and the armature 520 to, for example, slow the movement of the armature relative to the rotational speed of the motor shaft 508.

Figure 12:
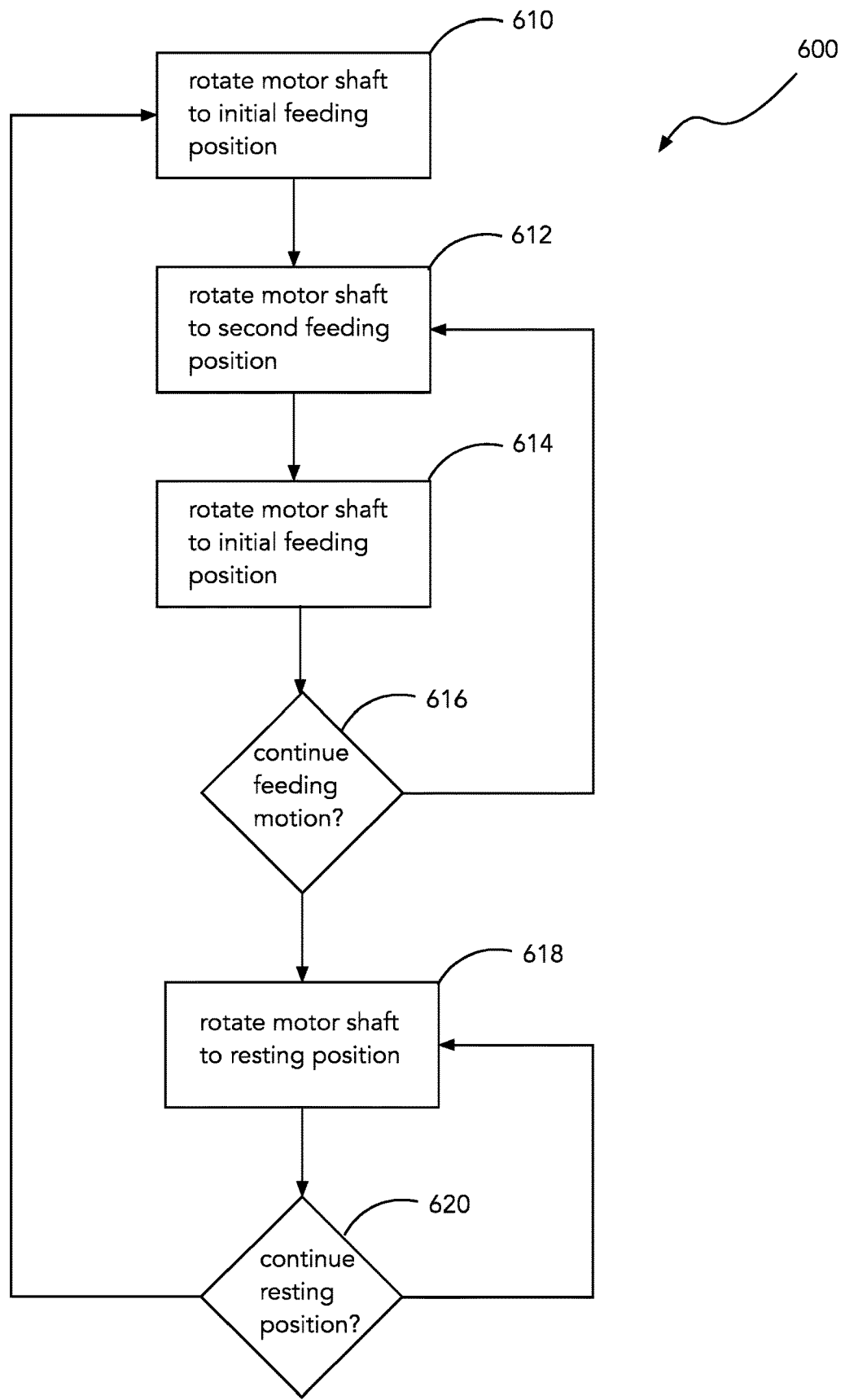
FIG. 12 is a schematic flow diagram of a method of operating a waterfowl decoy in accordance with the principles of the present invention.

Referring now to FIG. 12, there is illustrated a schematic flow diagram of a method by which a waterfowl decoy according to the present invention moves relative to a body of water in order to simulate actual movement of a duck engaging in a feeding motion. Once the decoy has been switched on, a remote control, which includes a feeding motion activation button and is in communication with the decoy, sends a wireless signal to the decoy to begin a preprogrammed feeding motion. When the feeding motion activation button is pressed, the decoy starts the feeding motion and will continue for a preset period of time or until the feeding motion activation button or a stop button is pressed to cause the decoy to end the feeding motion.

When the decoy enters the feeding mode 600, the decoy will begin from a resting position (see Position A shown in FIG. 1) in which the decoy is in a horizontal position relative to the surface of the body of water. That is, in the horizontal position, the head and tail of the decoy are generally horizontally aligned with the head and tail above the surface of the water and the body of the decoy floating on the water surface.

Once the feeding motion program begins, a first instruction (in the form of an electrical signal) is sent to the motor to cause the shaft of the motor of the decoy to rotate 610 thereby causing the body of the decoy to move from the resting position to a feeding position (see Position B shown in FIG. 5). The feeding position is approximately 90 degrees from the resting position. This is accomplished by rotating the shaft of the motor approximately 90 degrees to cause the armature, to which a counter-weight is attached, to rotate from a position that extends approximately 90 degrees from the bottom surface of the decoy to a position that is substantially parallel to the bottom surface of the decoy, thus causing the body of the decoy to rotate from a horizontal position to a more vertical position with the head of the decoy below the water surface. The motor of the decoy receives signals from the processor in the decoy, which translates into rotational movement of the shaft of the motor. With the motor fixed relative to the body of the decoy, rotation of the shaft of the motor causes corresponding movement of the armature relative to the body. It should be noted that the actual rotation of the decoy relative to the body of water may appear to be between about 70 degrees and about 100 degrees, depending on the buoyancy of the body of the decoy and the weight of the counter-weight attached to the end of the armature. The initial rotation of the body from the resting position to the first initial feeding position occurs within about 1 second. As a result of this movement of the body relative to the body of water and the head of the decoy entering the body of water, a ripple is created in the surface of the water around the decoy.

Once the decoy moves to the feeding position, the processor sends additional signals/instructions to the motor to cause the shaft of the motor to move in accordance with the preprogrammed feeding motion instructions. The second instruction sent to the motor is to rotate the shaft of the motor approximately 10-20 degrees from the 90 degree feeding position to a second feeding position 612 of approximately 70-80 degrees (see Position C shown in FIG. 5).

As the decoy moves to the second feeding position 612, movement of the head of the decoy upward towards the water surface moves water upwards, creating a swelling of water at the surface. At the same time the tail of the decoy is moving downward towards the water surface creating a movement of water near the rear of the decoy. The movement of the head and tail in the water creates a wake or ripple in the water surface.

After the shaft of the motor moves to the second feeding position, the processor sends another signal to the motor to move the shaft back to the first initial feeding position 614, thus moving the head of the decoy deeper into the water and the tail of the decoy back to a vertical or near vertical position. The motion of the decoy from the second feeding position back to the first initial feeding position causes an additional wake or ripple in the surface of the water.

So long as the processor sends commands to the motor to continue the feeding motion 616, the shaft of the motor is rotated between the second feeding position 612 and the first initial feeding position 614. Thus, during each feeding sequence, several commands are sent from the processor to the motor to move the decoy between the first initial vertical feeding position and a less than vertical feeding in the second feeding position. The feeding program causes the motor to move its shaft in a rhythmic cycle from the first initial feeding position to the second feeding position and back to the first initial feeding position in approximately 1 second intervals. Each cycle of movement creates a new set of ripples on the surface of the water.

After several cycles of feeding movement (e.g., 3-20) the motor moves the decoy back to a horizontal resting position 618 on the water surface. Movement from the feeding position to the resting position takes less than about 1 second to accomplish. Once again, movement from the feeding position to the resting position causes ripples in the surface of the water.

The decoy rests on the water surface for a chosen length of time so long as the program continues the resting position 620 that may vary between about 3 seconds and about 30 seconds. When the decoy is held in the resting position 620, no movement occurs, and thus no ripples are intentionally created.

At a predetermined time interval (e.g., between about 3 and about 30 seconds), the entire feeding movement is repeated with the decoy moving from the resting position 620 to the initial feeding position 610. As such, the decoy moves from a horizontal position on the water to a near-vertical position with only the tail section of the decoy above the water surface. The underwater feeding movement cycle 600 begins again. As before, after a predetermined number of movements between the first initial feeding position and the second feeding position, which may be a different number of cycles than the previous number of cycles according to the feeding program, the decoy returns to a resting state 620 on the surface of the water. Each movement of the decoy body creates ripples on the surface of the water that simulates the movements or wave patterns that a live duck would make when feeding on a body of water. The feeding mode 600 will continue until a predetermined number of feeding cycles have occurred or the user presses a stop button on the remote control.

Figure 13:
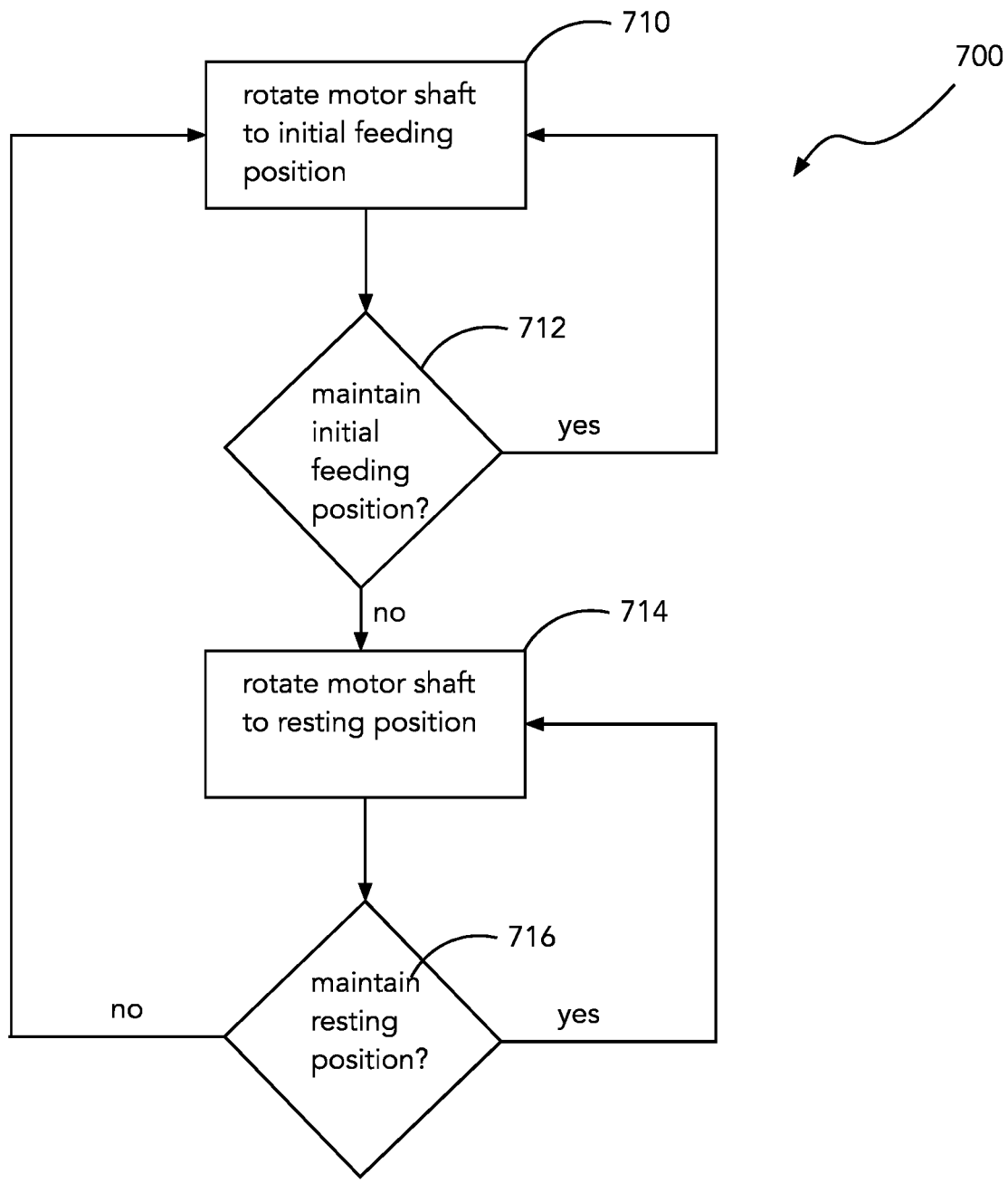
FIG. 13 is a schematic flow diagram of another embodiment of a method of operating a waterfowl decoy in accordance with the principles of the present invention.

Referring now to FIG. 13, the there is illustrated a schematic flow diagram of a method by which a waterfowl decoy according to the present invention can enter a power conservation mode to save battery life and extend the life of the motor.

In the conservation mode, the decoy is moved relative to a body of water in order to simulate actual movement of a duck engaging in a feeding motion. Once the decoy has been switched on, a remote control, which includes a conservation mode activation button and is in communication with the decoy, sends a wireless signal to the decoy to begin a preprogrammed conservation mode feeding motion. When the conservation mode feeding motion activation button is pressed, the decoy starts the conservation mode feeding motion and will continue for a preset period of time or until the conservation mode feeding motion activation button or a stop button is pressed to cause the decoy to end the conservation mode feeding motion.

When the decoy enters the conservation feeding mode 700, the decoy will begin from a resting position (see Position A shown in FIG. 1) in which the decoy is in a horizontal position relative to the surface of the body of water. That is, in the horizontal position, the head and tail of the decoy are generally horizontally aligned with the head and tail above the surface of the water and the body of the decoy floating on the water surface.

Once the feeding motion program begins, a first instruction (in the form of an electrical signal) is sent to the motor to cause the shaft of the motor of the decoy to rotate 710 thereby causing the body of the decoy to move from the resting position to a feeding position (see Position B shown in FIG. 5). The feeding position is approximately 90 degrees from the resting position. This is accomplished by rotating the shaft of the motor approximately 90 degrees to cause the armature, to which a counter-weight is attached, to rotate from a position that extends approximately 90 degrees from the bottom surface of the decoy to a position that is substantially parallel to the bottom surface of the decoy, thus causing the body of the decoy to rotate from a horizontal position to a more vertical position with the head of the decoy below the water surface. The motor of the decoy receives signals from the processor in the decoy, which translates into rotational movement of the shaft of the motor. With the motor fixed relative to the body of the decoy, rotation of the shaft of the motor causes corresponding movement of the armature relative to the body. It should be noted that the actual rotation of the decoy relative to the body of water may appear to be between about 70 degrees and about 100 degrees, depending on the buoyancy of the body of the decoy and the weight of the counter-weight attached to the end of the armature. The initial rotation of the body from the resting position to the first initial feeding position occurs within about 1 second. As a result of this movement of the body relative to the body of water and the head of the decoy entering the body of water, a ripple is created in the surface of the water around the decoy.

The decoy will remain in the first initial feeding position for a period of time (e.g., between about 5 and about 30 seconds), with no additional movement of the shaft of the motor. Thus, in the first initial feeding position, the tail remains in the air and head of the decoy remains under water with no additional feeding motion or feeding cycles initiated.

After a predetermined amount of time with the tail still in the air, if the first initial feeding position is no longer to be maintained 712, the motor receives a signal from the processor to move the decoy back to the resting position 714 on the surface of the water. Some ripples on the surface of the water are created during this motion.

The decoy will remain in the resting position for about 1 minute and up to about 10 minutes. If the resting position is no longer to be maintained 716, the cycle is repeated whereby the motor shaft is rotated to the first initial feeding position 710. This conservation mode feeding mode 700 will continue until a predetermined number of conservation mode feeding cycles have occurred or the user presses a stop button on the remote control.

There is thus disclosed an improved decoy and method of operating the improved decoy. In the foregoing specification, the present invention has been described with reference to specific exemplary embodiments. Various modifications and changes may be made, however, without departing from the spirit and scope of the present invention as set forth in the claims, including combinations of elements of the various illustrated embodiments. The specification and figures are illustrative, not restrictive, and modifications are intended to be included within the scope of the present invention. Accordingly, the scope of the present invention should be determined by the claims and their legal equivalents rather than by merely the examples described.

For example, the steps recited in any method or process claims may be executed in any order and are not limited to the specific order presented in the claims. Additionally, the components and/or elements recited in any apparatus claims may be assembled or otherwise operationally configured in a variety of permutations and are accordingly not limited to the specific configuration recited in the claims.

Benefits, other advantages, and solutions to problems have been described above with regard to particular embodiments. Any benefit, advantage, solution to problem, or any element that may cause any particular benefit, advantage, or solution to occur or to become more pronounced are not to be construed as critical, required, or essential features or components of any or all the claims.

The phrase "consisting essentially of" as used herein is intended to cover additional elements or functions that do not materially affect the basic and novel characteristics of the claimed invention. Thus, "consisting essentially of" is intended to encompass not only those components specifically listed, but also separate or additional components that do not materially alter the specifically recited functions or elements.

The terms "comprise", "comprises", "comprising", "having", "including", "includes" or any variations of such terms, are intended to reference a non-exclusive inclusion, such that a process, method, article, composition or apparatus that comprises a list of elements does not include only those elements recited, but may also include other elements not expressly listed or inherent to such process, method, article, composition or apparatus. Other combinations and/or modifications of the above-described structures, arrangements, applications, proportions, elements, materials, or components used in the practice of the present invention, in addition to those not specifically recited, may be varied or otherwise particularly adapted to specific environments, manufacturing specifications, design parameters, or other operating requirements without departing from the general principles of the same.

What is claimed is:

1. A method of simulating a feeding motion for a waterfowl decoy on a body of water, comprising:
    placing a waterfowl decoy on a body of water, the waterfowl decoy comprising:
        a body portion and a head portion at a front end of the body portion, the head portion and the body portion defining an outer surface that simulates a waterfowl, the body portion being at least partially buoyant in water;
        a motor coupled to a bottom of the body portion, the motor having a rotatable shaft;
        an elongate member having a first end fixed to the shaft of the motor at a fixed point to pivot the elongate member about the fixed point relative to the body portion, the elongate member movable by the shaft of the motor between a first position and a second position by corresponding movement of the shaft of the motor from a first rotational position to a second rotational position; and
        a mass coupled to a second end of the elongate member, the mass having sufficient weight to counterbalance the buoyancy of the body portion to cause the elongate member to remain substantially vertical in the body of water when the shaft of the motor is rotated causing the head portion to be submerged in the body of water when the mass is pivoted toward the head portion and causing the head portion to raise out of the body of water when the mass is pivoted away from the head portion;
    rotating the shaft of the motor from the first rotational position to the second rotational position thereby causing the body portion of the decoy to move from a substantially horizontal position to a substantially vertical position relative to the body of water;
    rotating the shaft of the motor from the second rotational position to a third rotational position thereby causing the elongate member to move from the second position to a third position and the body portion of the decoy to move from the substantially vertical position to a feeding position at an angle between the substantially horizontal position and the substantially vertical position, the third position being between the second position and the first position;
    rotating the shaft of the motor in a back and forth manner from the second rotational position to the third rotational position thereby causing the body portion of the decoy to move back and forth between the feeding position and the substantially vertical position to simulate a feeding motion by the decoy; and
    rotating the shaft of the motor from the third or second rotational position back to the first rotational position thereby causing the elongate member to move back to the first position and the body portion of the decoy to move back to the substantially horizontal position.

2. The method of claim 1, wherein when the elongate member is in the second position, the shaft of the motor has been rotated approximately between 90 and 100 degrees from the first rotational position to the second rotational position.

3. The method of claim 2, wherein in the third rotational position, the shaft of the motor has been rotated approximately between 10 and 20 degrees from the second rotational position.

4. The method of claim 1, wherein the shaft of the motor is rotated from the first rotational position to the second rotational position in approximately 1 second.

5. The method of claim 4, wherein the shaft of the motor is rotated from the second rotational position to the third rotational position in approximately 1 second.

6. The method of claim 5, wherein the shaft of the motor is repeatedly rotated between the second rotational position and third rotational position in intervals of between about 3 seconds and 30 seconds.

7. The method of claim 1, wherein the shaft of the motor is rotated between the second or third rotational position to the first rotational position in about 1 second.

8. The method of claim 1, wherein the shaft of the motor is rotated between the first rotational position and the second rotational position and back to the first rotational position without stopping the motor at the third rotational position.

9. The method of claim 8, wherein the shaft of the motor maintains the shaft of the motor in the second rotational position between about 5 and 30 seconds.

10. The method of claim 9, wherein the motor maintains the shaft of the motor in the first rotational position for between about 5 and 30 seconds before moving the shaft back to the second rotational position.

11. The method of claim 1, wherein the shaft of the motor repeats movement between the second rotational position and the third rotational position between 3 and 20 times before movement back to the first rotational position.

12. A method of simulating a feeding motion for a duck decoy on a body of water, comprising:
   providing a buoyant duck decoy on a body of water, the decoy comprising:
      a head portion, a body portion and a tail portion;
      a motor coupled to the body portion, the motor having a rotatable shaft extending from the motor;
      a rigid elongate member having a first end fixed to the shaft of the motor at a fixed point and a second end coupled to a mass, the elongate member being pivotable about the fixed point relative to the body portion from a first position to a second position, in the first position, the elongate member extending substantially perpendicular from a bottom surface of the body portion and, in the second position, the elongate member extending substantially parallel to the bottom surface of the body portion and toward a front of the decoy, the elongate member having a length to position the mass in front of the body portion of the decoy when the elongate member is in the second position;
      the mass having sufficient weight to counterbalance the buoyancy of the duck decoy to cause the elongate member to remain substantially vertical in the body of water when the elongate member is pivoted to the second position causing the head portion of the decoy to be submerged in the body of water and causing the head portion to raise out of the body of water when the elongate member is pivoted to the first position;
   rotating the shaft of the motor so as to move the elongate member from the first position to the second position thereby causing the body portion of the decoy to move from a substantially horizontal position to a substantially vertical position relative to the body of water;
   rotating the shaft of the motor so as to move the elongate member from the second position to a third position that is between the first position and the second position and rotating the shaft of the motor in a back and forth manner so as to move the elongate member back and forth between the second and third positions thereby causing the decoy to simulate a feeding motion; and
   rotating the shaft of the motor to move the elongate member back to the first position thereby causing the body portion of the decoy to move back to the substantially horizontal position so that the head portion of the decoy is out of the water.

13. The method of claim 12, wherein when the elongate member is in the second position, the elongate member has been pivoted approximately between 90 and 100 degrees from the first position.

14. The method of claim 12, wherein when the elongate member is in the third position, the elongate member has been pivoted approximately between 10 and 20 degrees from the second position.

15. The method of claim 14, wherein the motor moves the elongate member from the second position to the third position in approximately 1 second.

16. The method of claim 12, wherein the motor moves the elongate member from the first position to the second position in approximately 1 second.

17. The method of claim 12, wherein the motor moves the elongate member between the second position and the third position between 3 and 20 times before movement of the elongate member back to the first position.

18. The method of claim 17, wherein the shaft of the motor is repeatedly oscillated to move the elongate member between the second position and the third position in intervals of between about 3 seconds and 30 seconds.

19. The method of claim 12, wherein the motor moves the elongate member between the second position or third position and the first position in about 1 second.

20. The method of claim 12, wherein the motor maintains the elongate member in the second position for between about 5 and 30 seconds.

* * * * *